United States Patent
Zhang et al.

(10) Patent No.: US 9,001,777 B2
(45) Date of Patent: Apr. 7, 2015

(54) SCHEDULING INFORMATION FOR WIRELESS COMMUNICATIONS

(75) Inventors: Danlu Zhang, San Diego, CA (US); Sharad Deepak Sambhwani, San Diego, CA (US); Aziz Gholmieh, Del Mar, CA (US); Rohit Kapoor, San Diego, CA (US); Jilei Hou, San Diego, CA (US); Ozcan Ozturk, San Diego, CA (US); Arjun Bharadwaj, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 686 days.

(21) Appl. No.: 12/724,350

(22) Filed: Mar. 15, 2010

(65) Prior Publication Data

US 2010/0238882 A1  Sep. 23, 2010

Related U.S. Application Data

(60) Provisional application No. 61/160,859, filed on Mar. 17, 2009, provisional application No. 61/248,794, filed on Oct. 5, 2009.

(51) Int. Cl.
*H04W 4/00* (2009.01)
*H04L 5/00* (2006.01)
*H04W 72/12* (2009.01)

(52) U.S. Cl.
CPC ............. *H04L 5/00* (2013.01); *H04W 72/1252* (2013.01); *H04W 72/1284* (2013.01)

(58) Field of Classification Search
CPC ............ H04W 72/12; H04W 72/1205; H04W 72/1278; H04W 72/0407; H04W 72/0413; H04W 72/0426; H04W 52/286; H04W 52/365; H04L 5/0007; H04L 5/0053; H04L 27/2601

USPC ......... 370/328–334, 341, 436–437, 441–444, 370/449–450, 452.2, 464, 509
See application file for complete search history.

(56) References Cited

U.S. PATENT DOCUMENTS 6,363,062 B1 * 3/2002 Aaronson et al. ............. 370/348
2003/0128687 A1 * 7/2003 Worfolk et al. ............... 370/351

(Continued)

FOREIGN PATENT DOCUMENTS

CN  101083614 A  12/2007
CN  101185278 A  5/2008

(Continued)

OTHER PUBLICATIONS

International Search Report and Written Opinion—PCT/US2010/027667, International Search Authority—European Patent Office—Aug. 2, 2006.

(Continued)

*Primary Examiner* — Andrew Chriss
*Assistant Examiner* — Rasha Fayed
(74) *Attorney, Agent, or Firm* — Darren M. Simon

(57) ABSTRACT

Systems and methods for communicating over multiple carriers are described herein. A predetermined event triggers the generation of scheduling information for two or more of the carriers. The predetermined event may comprise expiration of a timer set for at least one of the two or more carriers, storing data in a buffer having a higher transmission priority than data previously stored in the buffer, or changing at least one of the two or more carriers from being served by a first cell to being served by a second cell.

20 Claims, 6 Drawing Sheets

(56) References Cited

U.S. PATENT DOCUMENTS

| | | | |
|---|---|---|---|
| 2005/0220042 A1* | 10/2005 | Chang et al. | 370/278 |
| 2006/0221883 A1 | 10/2006 | Damnjanovic et al. | |
| 2006/0280145 A1 | 12/2006 | Revel et al. | |
| 2007/0177536 A1* | 8/2007 | Brueck et al. | 370/328 |
| 2007/0211663 A1* | 9/2007 | Jiang | 370/329 |
| 2008/0045255 A1 | 2/2008 | Revel et al. | |
| 2008/0049669 A1 | 2/2008 | Lundby et al. | |
| 2008/0232323 A1* | 9/2008 | Jeong et al. | 370/331 |
| 2009/0034507 A1 | 2/2009 | Chang et al. | |
| 2009/0222304 A1 | 9/2009 | Higgins et al. | |
| 2009/0257387 A1* | 10/2009 | Gholmieh et al. | 370/329 |
| 2010/0034113 A1* | 2/2010 | Marinier et al. | 370/252 |
| 2010/0034114 A1* | 2/2010 | Kim et al. | 370/252 |
| 2010/0111023 A1* | 5/2010 | Pelletier et al. | 370/329 |
| 2010/0158220 A1 | 6/2010 | Silverman | |
| 2010/0195607 A1* | 8/2010 | Lee et al. | 370/329 |
| 2011/0257992 A1 | 10/2011 | Scantland et al. | |
| 2011/0310795 A1* | 12/2011 | Andersson et al. | 370/328 |
| 2012/0005192 A1 | 1/2012 | Bao et al. | |
| 2012/0036255 A1 | 2/2012 | Polsky | |
| 2012/0039264 A1* | 2/2012 | Kim et al. | 370/329 |
| 2012/0170532 A1* | 7/2012 | Kato et al. | 370/329 |
| 2012/0188961 A1* | 7/2012 | Suzuki et al. | 370/329 |
| 2012/0300732 A1* | 11/2012 | Ode | 370/329 |
| 2012/0307773 A1* | 12/2012 | Tiirola et al. | 370/329 |
| 2012/0327884 A1* | 12/2012 | Seo et al. | 370/329 |

FOREIGN PATENT DOCUMENTS

| | | |
|---|---|---|
| CN | 101194476 A | 6/2008 |
| CN | 101340711 A | 1/2009 |
| CN | 101340712 A | 1/2009 |
| EP | 2034755 A1 | 3/2009 |
| WO | 2007139188 A1 | 12/2007 |

OTHER PUBLICATIONS

Taiwan Search Report—TW099107936—TIPO—Mar. 5, 2013.

* cited by examiner

SCHEDULING INFORMATION FOR WIRELESS COMMUNICATIONS

CLAIM OF PRIORITY UNDER 35 U.S.C. §119

The present application for patent claims priority to U.S. Provisional Application No. 61/160,859 entitled "REDUCING REDUNDANCY IN SCHEDULING INFORMATION FEEDBACK IN MULTI-CARRIER HSUPA," filed Mar. 17, 2009, and to U.S. Provisional application No. 61/248,794 entitled "REDUCING REDUNDANCY IN SCHEDULING INFORMATION FEEDBACK IN MULTI-CARRIER HSUPA," filed Oct. 5, 2009, which are assigned to the assignee hereof and hereby expressly incorporated by reference herein.

BACKGROUND

1. Field

The present application relates generally to wireless communications, and more specifically to systems, devices, and methods for communicating over multiple carriers.

2. Background

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance. To support the enhanced performance new systems, devices, and methods for efficiently communicating over multiple carriers are needed.

SUMMARY

The systems, methods, and devices of this disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include efficient communication over multiple carriers.

One embodiment of the disclosure provides an apparatus for wirelessly communicating. The apparatus comprises a buffer configured to store data to be transmitted. The apparatus also comprises an antenna configured to wirelessly transmit a request for permission to send data stored in the buffer over a plurality of carriers. The apparatus additionally comprises a receiver configured to receive a communication granting the requested permission. The apparatus further comprises a processor configured to periodically generate scheduling information based at least in part on data stored in the buffer. A predetermined event triggers the generation of the scheduling information for two or more of the plurality of carriers. The predetermined event may comprise expiration of a timer set for at least one of the two or more carriers, storing data in the buffer having a higher transmission priority than data previously stored in the buffer, or changing at least one of the two or more carriers from being served by a first cell to being served by a second cell.

Another embodiment of the disclosure provides a method of wirelessly communicating. The method comprises storing data to be transmitted pursuant to a grant of permission. The method additionally comprises generating, in response to occurrence of a predetermined event, scheduling information for a plurality of carriers based at least in part on the stored data. The method further comprises wirelessly transmitting at least a portion of the generated scheduling information over one or more of the plurality of carriers. The predetermined event may comprise identifying expiration of a timer set for at least one of the plurality of carriers, storing data having a higher transmission priority than previously-stored data, or changing at least one of the plurality of carriers from being served by a first cell to being served by a second cell.

Yet another embodiment of the disclosure provides an apparatus for wirelessly communicating. The apparatus comprises means for storing data to be transmitted. The apparatus also comprises means for wirelessly transmitting a request for permission to send data stored in the storing means over a plurality of carriers. The apparatus additionally comprises means for receiving a communication granting the requested permission. The apparatus further comprises means for periodically generating scheduling information based at least in part on data stored in the storing means. A predetermined event triggers the generation of the scheduling information for two or more of the plurality of carriers. The predetermined event may comprise expiration of a timer set for at least one of the two or more carriers, storing data in the storing means having a higher transmission priority than data previously storing means, or changing at least one of the two or more carriers from being served by a first cell to being served by a second cell.

A further embodiment of the disclosure provides a computer program product comprising computer readable medium. The computer readable medium comprises code for causing a computer to store data to be transmitted pursuant to a grant of permission. The computer readable medium further comprises code for causing a computer to generate scheduling information for a plurality of carriers based at least in part on the stored data. The generation of scheduling information is triggered by a predetermined event. The computer-readable medium further comprises code for causing a computer to wirelessly transmit at least a portion of the generated scheduling information over one or more of the plurality of carriers. The predetermined event may comprise identifying expiration of a timer set for at least one of the plurality of carriers, storing data having a higher transmission priority than previously-stored data, or changing at least one of the plurality of carriers from being served by a first cell to being served by a second cell.

DETAILED DESCRIPTION

The word "exemplary" is used herein to mean "serving as an example, instance, or illustration." Any embodiment described herein as "exemplary" is not necessarily to be construed as preferred or advantageous over other embodiments. The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Single carrier frequency division multiple access (SC-FDMA), which utilizes single carrier modulation and frequency domain equalization is a technique for wirelessly communicating. SC-FDMA has similar performance and essentially the same overall complexity as those of OFDMA systems. An SC-FDMA signal has lower peak-to-average power ratio (PAPR) because of its inherent single carrier structure. SC-FDMA has drawn great attention, especially in connection with uplink communications where lower PAPR greatly benefits the mobile terminal in terms of transmit power efficiency. It is currently a working assumption for uplink multiple access scheme in 3GPP Long Term Evolution (LTE), or Evolved UTRA.

Figure 1:
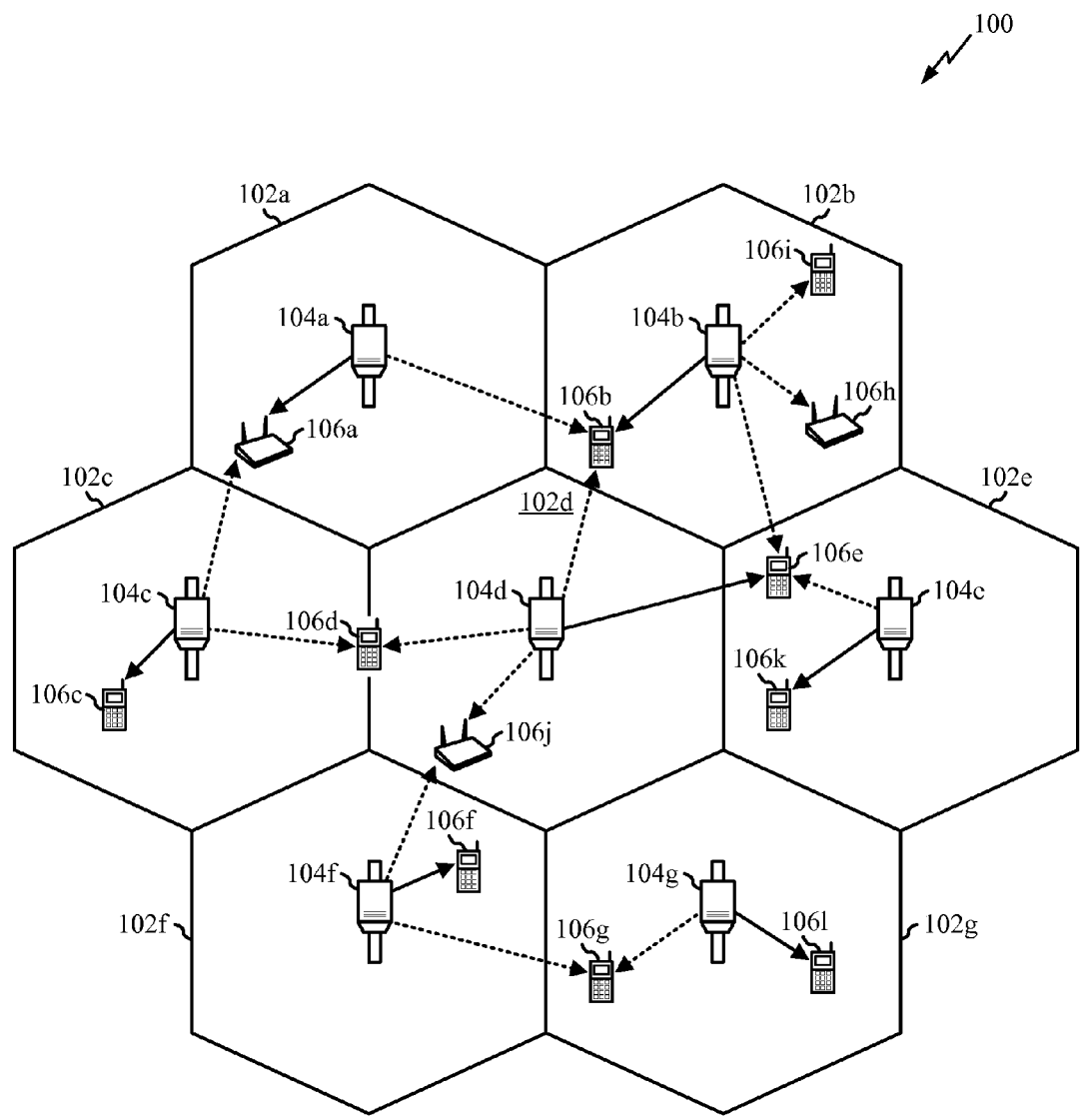
FIG. 1 illustrates an exemplary wireless communication network.

FIG. 1 illustrates an exemplary wireless communication network 100. The wireless communication network 100 is configured to support communication between a number of users. The wireless communication network 100 may be divided into one or more cells 102, such as, for example, cells 102a-102g. Communication coverage in cells 102a-102g may be provided by one or more nodes 104 (e.g., base stations), such as, for example, nodes 104a-104g. Each node 104 may provide communication coverage to a corresponding cell 102. The nodes 104 may interact with a plurality of access terminals (ATs), such as, for example, ATs 106a-106l.

Each AT 106 may communicate with one or more nodes 104 on a forward link (FL) and/or a reverse link (RL) at a given moment. A FL is a communication link from a node to an AT. A RL is a communication link from an AT to a node. The FL may also be referred to as the downlink. Further, the RL may also be referred to as the uplink. The nodes 104 may be interconnected, for example, by appropriate wired or wireless interfaces and may be able to communicate with each other. Accordingly, each AT 106 may communicate with another AT 106 through one or more nodes 104. For example, the AT 106j may communicate with the AT 106h as follows. The AT 106j may communicate with the node 104d. The node 104d may then communicate with the node 104b. The node 104b may then communicate with the AT 106h. Accordingly, communication is established between the AT 106j and the AT 106h.

The wireless communication network 100 may provide service over a large geographic region. For example, the cells 102a-102g may cover only a few blocks within a neighborhood or several square miles in a rural environment. In one embodiment, each cell may be further divided into one or more sectors (not shown).

As described above, a node 104 may provide an access terminal (AT) 106 access within its coverage area to a communications network, such as, for example the Internet or a cellular network.

An AT 106 may be a wireless communication device (e.g., a mobile phone, router, personal computer, server, etc.) used by a user to send and receive voice or data over a communications network. An access terminal (AT) may also be referred to herein as a user equipment (UE), as a mobile station (MS), or as a terminal device. As shown, ATs 106a, 106h, and 106j comprise routers. ATs 106b-106g, 106i, 106k, and 106l comprise mobile phones. However, each of ATs 106a-106l may comprise any suitable communication device.

A wireless multiple-access communication system may simultaneously support communication for multiple wireless access terminals. As mentioned above, each access terminal may communicate with one or more nodes via transmissions on the forward and reverse links. The forward link (or downlink) refers to the communication link from the node to the access terminal, and the reverse link (or uplink) refers to the communication link from the access terminal to the node. This communication link may be established via a single-in-single-out system, a multiple-in-multiple-out ("MIMO") system, or some other type of system.

A MIMO system employs multiple (NT) transmit antennas and multiple (NR) receive antennas for data transmission. A MIMO channel formed by the NT transmit and NR receive antennas may comprise NS independent channels, which are also referred to as spatial channels, where NS≤min{NT, NR}. Each of the NS independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables a device (e.g., a node, an access terminal, etc.) to extract a transmit beam-forming gain on the forward link when multiple antennas are available at the device.

The teachings herein may be incorporated into a device (e.g., a node, an access terminal, etc.) employing various components for communicating with at least one other device.

Figure 2:
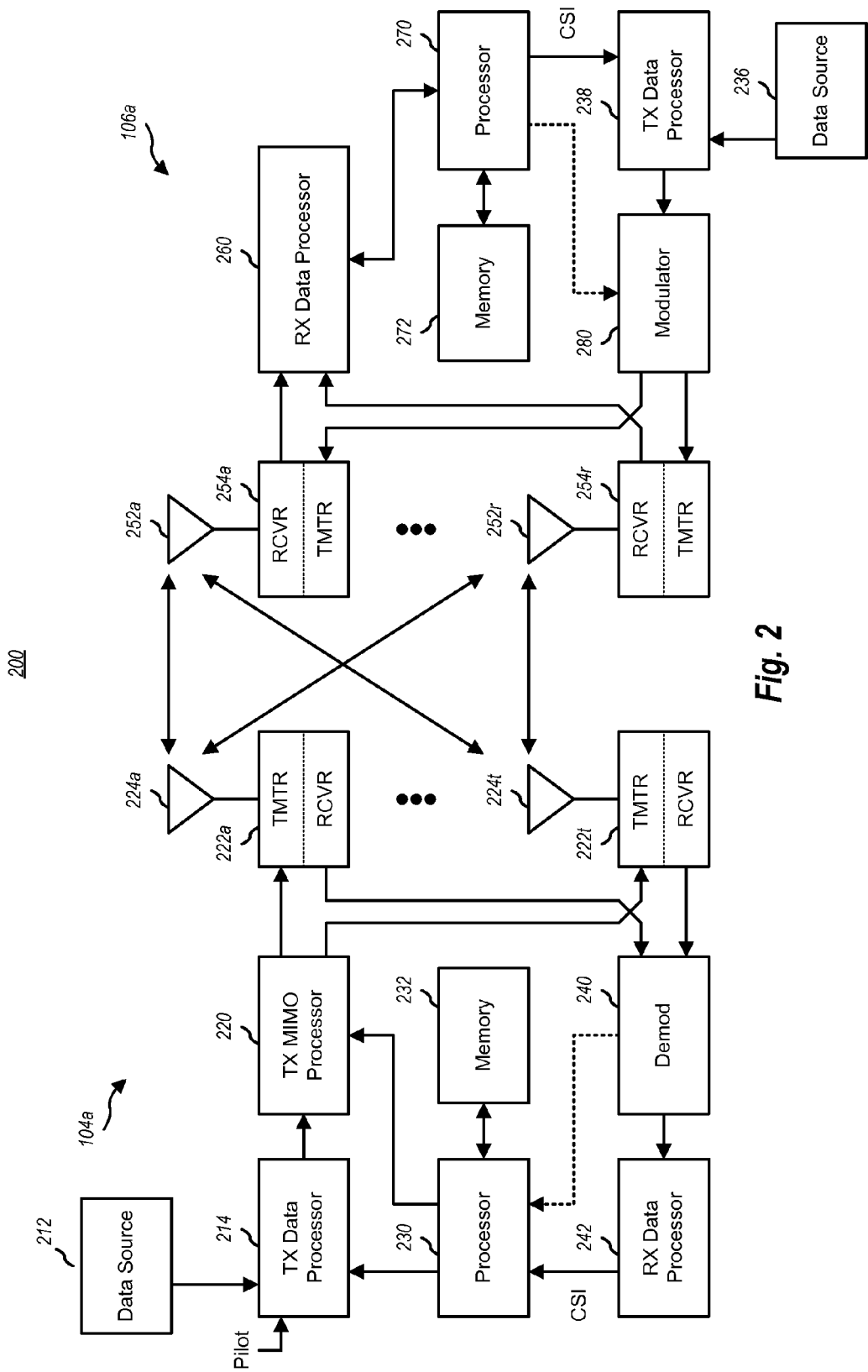
FIG. 2 is a functional block diagram illustrating an exemplary node and an exemplary access terminal shown in FIG. 1.

FIG. 2 illustrates functional block diagrams of an exemplary node 104a and an exemplary access terminal 106a shown in FIG. 1. In a MIMO system 200, the node 104a communicates with one or more ATs such as the AT 106a. At the node 104a, traffic data for a number of data streams is provided from a data source 212 to a transmit ("TX") data processor 214.

In one embodiment, each data stream is transmitted over a respective transmit antenna. The TX data processor 214 formats, codes, and interleaves the traffic data for each data stream based on a particular coding scheme selected for that data stream to provide coded data. In other embodiments, a plurality of data streams are transmitted over one antenna.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by executing instructions with a processor 230. A data memory 232 may store program code, data, and other information used by the processor 230 or other components of the node 104a.

The modulation symbols for all data streams are then provided to a TX MIMO processor 220, which may further process the modulation symbols (e.g., for OFDM). The TX MIMO processor 220 then provides NT modulation symbol streams to NT transceivers 222a through 222t. In some aspects, the TX MIMO processor 220 applies beam-forming weights to the symbols of the data streams and to the antenna from which the symbol is being transmitted.

Each transceiver 222 receives and processes a respective symbol stream to provide one or more analog signals, and further conditions (e.g., amplifies, filters, and upconverts) the analog signals to provide a modulated signal suitable for transmission over the MIMO channel. NT modulated signals from transceivers 222a through 222t are then transmitted from NT antennas 224a through 224t, respectively.

At the AT 106a, the transmitted modulated signals are received by NR antennas 252a through 252r and the received signal from each antenna 252 is provided to a respective transceiver 254a through 254r. Each transceiver 254 conditions (e.g., filters, amplifies, and downconverts) a respective received signal, digitizes the conditioned signal to provide samples, and further processes the samples to provide a corresponding "received" symbol stream.

A receive ("RX") data processor 260 then receives and processes the NR received symbol streams from NR transceivers 254 based on a particular receiver processing technique to provide NT "detected" symbol streams. The RX data processor 260 then demodulates, deinterleaves, and decodes each detected symbol stream to recover the traffic data for the data stream. The processing performed by the RX data processor 260 is complementary to that performed by the TX MIMO processor 220 and the TX data processor 214 at the node 104a.

A processor 270 periodically determines which pre-coding matrix to use. The processor 270 formulates a reverse link message comprising a matrix index portion and a rank value portion. A data memory 272 may store program code, data, and other information used by the processor 270 or other components of the AT 106a.

The reverse link message may comprise various types of information regarding the communication link and/or the received data stream. The reverse link message is then processed by a TX data processor 238. The TX data processor 238 also receives traffic data for a number of data streams from a data source 236. The modulator 280 modulates the data streams. Further, the transceivers 254a through 254r condition the data streams and transmit the data streams back to the node 104a.

At the node 104a, the modulated signals from the AT 106a are received by the antennas 224. Further, the transceivers 222 condition the modulated signals. A demodulator ("DEMOD") 240 demodulates the modulated signals. A RX data processor 242 processes the demodulated signals and extracts the reverse link message (e.g., information) transmitted by the AT 106a. The processor 230 then determines which pre-coding matrix to use for determining the beam-forming weights. Further, the processor 230 processes the extracted message. It should be appreciated that for each node 104a and AT 106a the functionality of two or more of the described components may be provided by a single component. Similarly, the functionality of a single described component may be split among a plurality of components.

As discussed above with respect to FIG. 1, the AT 106a may communicate with each of the nodes 104a-104g when in communication range of each of the nodes 104a-104g. The AT 106a may be configured to determine which node 104a-104g provides the "best" signal where the AT 106a is located and accordingly communicate with that node 104a-104g. For example, the AT 106a may receive pilot signals that are transmitted from one or more of the nodes 104a-104g. The AT 106a may calculate the signal-to-noise ratio (SNR) of the pilot signals. The pilot signal with the highest SNR may be the "best" signal. It should be noted that other quality estimates for determining the "best" signal may be used such as signal-to-noise-plus-interference ratio (SNIR), carrier-to-interference ratio (C/I), etc. However, for illustrative purposes only, SNR is used in the description herein. Accordingly, the AT 106a may communicate with the node 104a-104g that transmitted the pilot signal with the highest SNR.

As the AT 106a moves between and is served by different cells 102a-102g, the AT 106a may be configured to handoff between nodes 104a-104g. For example, the AT 106a may be in cell 102a and communicate with node 104a. The AT 106a may then move to the cell 102b. In the cell 102b, the pilot signal of the node 104b may have a higher SNR than the pilot signal of the node 104a as received by the AT 106a. Accordingly, the AT 106a may handoff to the node 104b from the node 104a and begin communicating with the node 104b instead of the node 104a.

The AT 106a may maintain a list or set of nodes 104 (corresponding to cells 102 serving the AT 106a) referred to as an active set to which the AT 106a is configured to handoff. In one embodiment, the active set is configured as a radio link set (RLS). In some embodiments, a radio link set comprises one or more radio links that have a common generation of Transmit Power Control (TPC). Those of skill in the art will appreciate that the AT 106a may switch between being served by cells in the active or radio link set. In some embodiments, the AT 106a may communicate with a plurality of nodes 104 in the active or radio link set substantially concurrently. In some embodiments, the AT 106a is configured to identify and switch to a cell 102 in the system 100 that is not within the current active or radio link set of AT 106a, for example when the cell that the AT 106a switches to identified by the AT 106a and provides a "better" signal than the cells in the current active or radio link set.

The AT 106a may maintain the active or radio link set by searching for nodes 104 within communication range of the AT 106a. For example, when the AT 106a receives a pilot signal from one or more nodes 104a-104g, the AT 106a may measure the SNR of the received pilot signal. If the SNR of the received pilot signal is greater than the SNR of the nodes 104 of the set, the node 104 with the lowest SNR is removed from the set and the node from which the pilot signal is received is added to the set. Those of skill in the art will appreciate other methods which the AT 106a may utilize to identify, add, and/or subtract nodes from an active or radio link set.

As discussed above, the AT 106a may transmit information, signals, data, instructions, commands, bits, symbols, and the like (referred to collectively herein as "data") to the node 104 via an uplink. Further, the node 104 may transmit data to the AT 106*a* via a downlink. Each of the uplink and the downlink may comprise one or more carriers. A carrier comprises a frequency range (e.g., 850 MHz±7 MHz). A carrier of the uplink may be referred to as an uplink carrier. A carrier of the downlink may be referred to as a downlink carrier. In one embodiment, the AT 106*a* transmits data to the node 104 over a plurality of uplink carriers, each carrier comprising a different frequency range. Further, the node 104 may transmit data to the AT 106*a* over one or more downlink carriers, each carrier comprising a different frequency range. In one embodiment, the uplink carriers comprise different frequencies than the downlink carriers. In another embodiment, one or more of the uplink carriers and one or more of the downlink carriers share a common frequency.

Each downlink carrier and each uplink carrier may further comprise one or more communication channels. A channel is a logical division of the resources available for transmitting data over a carrier. For example, various techniques may be used to transmit data over a carrier such as code division multiplexing (CDM), space-division multiplexing (SDM), time-division multiplexing (TDM), etc. Each of these techniques may utilize different resources (e.g., codes, time intervals, etc.) to transmit/receive data. However, there may be a finite amount of resources available on a carrier for transmitting/receiving data. A channel, therefore, may be defined as the resources of the carrier reserved for transmitting/receiving certain types of data.

In one embodiment, the logical channels are classified into control channels and traffic channels. Control channels may comprise channels used to send control information (e.g., channel quality indication (CQI) feedback, acknowledgement/negative acknowledgement (ACK/NACK), hybrid automatic repeat request (HARD) information, uplink scheduling requests, other payload, etc.). Traffic channels may comprise channels used to send content data (e.g., audio data, video data, web packets, etc.).

The control channels may comprise one or more of: a broadcast control channel (BCCH) which is a DL channel for broadcasting system control information, a paging control channel (PCCH) which is a DL channel that transfers paging information, a multicast control channel (MCCH) which is a point-to-multipoint DL channel used for transmitting multimedia broadcast and multicast service (MBMS) scheduling and control information for one or several multicast traffic channels (MTCHs), and a dedicated control channel (DCCH) which is a point-to-point bi-directional channel that transmits dedicated control information and is used by ATs having a radio resource control (RRC) connection.

The traffic channels may comprise one or more of: a dedicated traffic channel (DTCH) which is a point-to-point bi-directional channel, dedicated to one AT, for the transfer of user information; and a MTCH for a point-to-multipoint DL channel for transmitting traffic data.

In one embodiment, one or more of the channels of a carrier are common channels or broadcast channels. A common channel of a carrier may be used for communication between multiple devices. For example, a common channel may be used for communication between the node 104*b* and all of the ATs 106 within the cell 102*b* serviced by the node 104*b*, which in the system 100 are illustrated as being ATs 106*b*, 106*h*, and 106*i*. Further, one or more channels of a carrier may be dedicated channels for communication between one or more nodes and a defined set of ATs that may be less than all of the ATs served by the one or more nodes. For example, a dedicated channel may be used only for communication between the node 104*b* and the AT 106*b*.

The transmission of information over a carrier may be affected by the conditions on that carrier. For example, the power level used to transmit information over the carrier may be adjusted for various reasons. In one embodiment, a total power may be controlled based on a link budget and system stability. The link budget may be achieved by maintaining the communication performance of a carrier for ATs on the edge of a cell, for example. System stability may be achieved by avoiding power racing between users within one cell or across multiple cells. Those of skill in the art will appreciate that other methods of adjusting a power level may be utilized.

ATs near the edge of a cell may experience different carrier conditions than ATs that are located closer to the node serving the cell. For example, ATs near the edge of the cell 102*a* may receive signals from the node 104*a* with a lower signal-to-noise ratio (SNR) than an AT closer to the node 104*a* serving the cell 102*a*. This may be due to greater interference at the edge of the cell 102*a* from transmission from ATs and nodes of cells neighboring the cell 102*a* (e.g., cells 102*b*-102*d*). Since ATs from within one cell and/or across multiple cells may receive communications signals on the same carrier frequency, the signals may interfere with each other.

Receiving signals with a sufficient SNR increases the likelihood that the received signals will be properly interpreted. One way of increasing the received SNR of a given communication signal is to transmit the signal with greater power from the source. However, the communication signal may interfere with other communication signals sent over the same carrier frequency, and thus adversely affect the SNR of the other communication signals where the other communication signals are received. For example, the AT 106*a* and the AT 106*b* may both be in the cell 102*a*. Further, each may utilize a common channel of a first carrier frequency used by all ATs communicating with the node 104*a* to communicate with the node 104*a*. Accordingly, transmissions from the AT 106*a* may act as interfering signals to transmission of the AT 106*b*. Accordingly, the power levels used for transmissions by both the AT 106*a* and the AT 106*b* for transmissions may be controlled so that the SNR at the node 104*a* of signals received from the ATs 106*a* and 106*b* are acceptable.

In some embodiments, ATs 106 having data to transmit are configured to request permission to transmit the data. A packet scheduler at a node 104 or at a location central to a plurality of the nodes 104 may then schedule the AT 106 to transmit the data by transmitting a grant of permission to the AT 106. The grant may comprise information identifying a time at which the AT 106 may transmit the data, a coding or convolution that the AT 106 may use to transmit the data, a quality of service allocated to the AT 106, a power with which the AT 106 may transmit, and/or an amount of data that the AT 106 may transmit, among other information. In some embodiments, the grant of permission is referred to as a serving grant. In some embodiments, the AT 106 may transmit data at very low rates in the absence of a serving grant, but must receive the serving grant in order to transmit data at a rate above a certain level. For example, the permission or serving grant may include a traffic-to-pilot ratio (T/P) at which the AT 106 may transmit the data.

The serving grant may be determined based on any number of factors. For example, ATs 106 that are able to transmit data with a high SNR may be scheduled to transmit. As another example, ATs 106 may be scheduled according to a quality of service (QoS) allocated to the ATs 106. In some embodiments, the ATs 106 are scheduled so as to control a total transmit power of all of the ATs 106, for example according to a link budget and/or system stability as discussed above. Properly scheduling the ATs 106 for transmission may increase the stability of the system and increase the reliability with which signals are received by the nodes 104 from the ATs 106. In some embodiments, requests and grants are implemented according a High-Speed Uplink Packet Access (HSUPA) protocol or an Enhanced Uplink (EUL) protocol.

As described above, the ATs 106 may transmit data over a plurality of carriers. Transmission over multiple carriers may provide several advantages. For example, diverse data may be transmitted substantially concurrently or in close temporal proximity over several carriers, thereby increasing the throughput of the system. As another example, the same or similar data may be sent over several carriers, thereby increasing the likelihood of reception at the node 104 of the data due to signal diversity. In some embodiments, the carriers over which the data is transmitted are selected so as to reduce interference with other signals being transmitted. For example, one of the ATs 106 may be assigned a first subset of carriers available for transmission in the system 100, while another of the ATs 106 may be assigned a second subset of the carriers. The first and second subsets may share carriers, or the carriers in the first and second subsets may be distinct. The subsets may be chosen so as to avoid conflicts between transmitting ATs 106. As another example, the carriers may be selected so as to increase the SNR of a transmitted signal, for example due to fading characteristics of different frequencies when transmitted from different locations with the cell 102 or the system 100.

Figure 3:
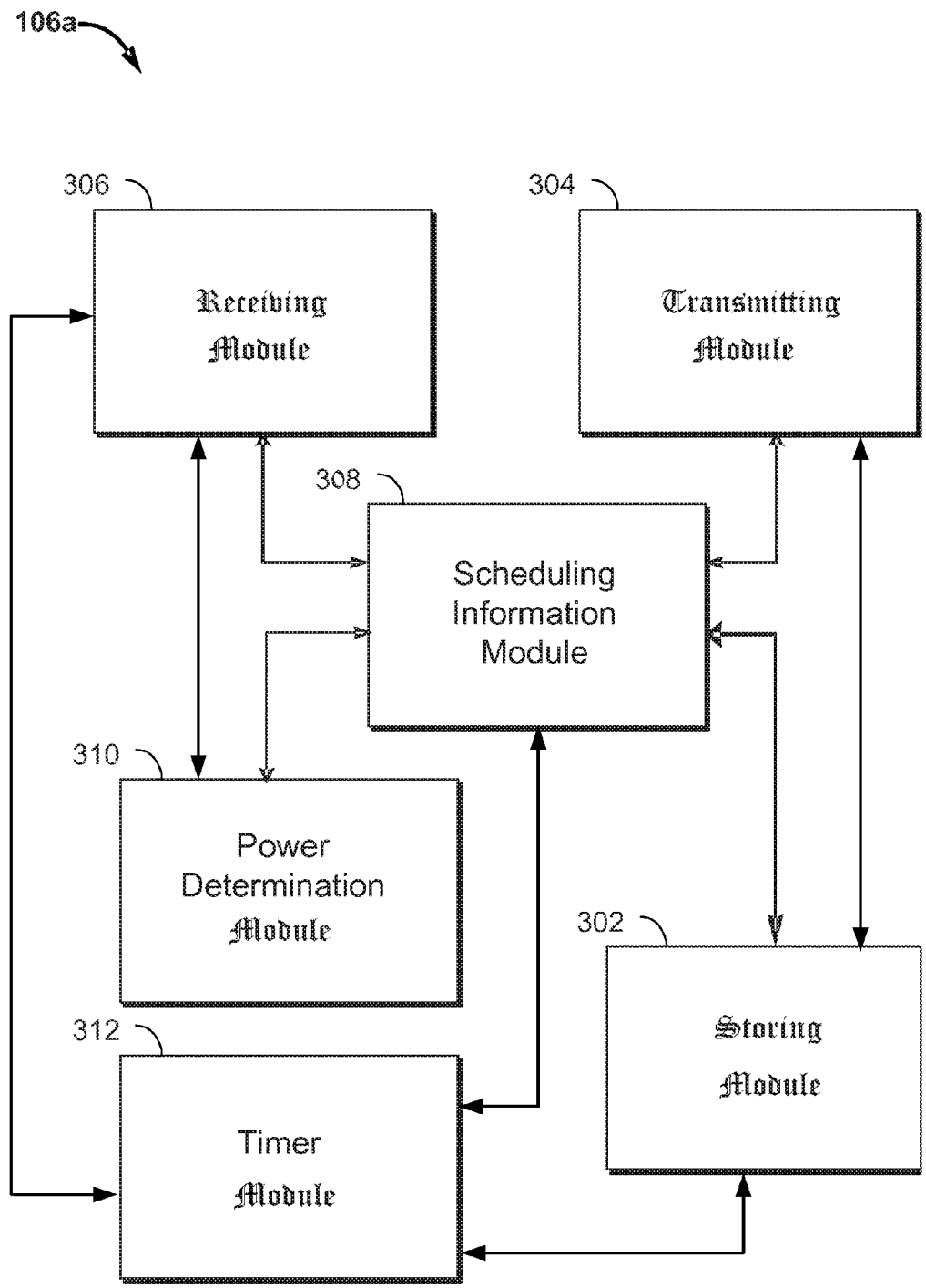
FIG. 3 is a functional block diagram of a second exemplary access terminal of FIG. 1.

FIG. 3 is a functional block diagram of a second exemplary access terminal 106a of FIG. 1. As discussed above, the AT 106a may be a mobile phone. The AT 106a may be used to communicate with the node 104a via a plurality of carriers. Although the following description refers to embodiments of the AT 106a, and may further refer to the node 104a, those of skill in the art will understand that in some embodiments of the system 100 described with respect to FIG. 1 the embodiments of the AT 106a discussed herein may be implemented for any of the ATs 106 and/or for communication with any of the nodes 104.

The AT 106a may comprise a storing module 302 used to store data. A portion or all of the data may be for transmission, for example to the node 104a. As discussed above, the data may comprise any combination of information, bits, symbols, or other data or representations. The storing module may be implemented using the memory 272 described above with respect to FIG. 2. In some embodiments, the storing module 302 comprises a data buffer or a memory array, or other data structure, configured to store data. The storing module 302 may comprise a plurality of these elements as well. The storing module 302 may receive data to transmit from a number of sources. For example, the data may be generated by or received from the data source 236 and/or the processor 270 described with respect to FIG. 2, or may be derived in part from received information, for example as received using one or more of the transceivers 254a-254r.

The storing module 302 may comprise processing module cache, including a multi-level hierarchical cache in which different levels have different capacities and access speeds. The storing module 302 may also comprise random access memory (RAM), other volatile storage devices, or non-volatile storage devices. The storage may include hard drives, optical discs, such as compact discs (CDs) or digital video discs (DVDs), flash memory, floppy discs, magnetic tape, and Zip drives.

The AT 106a may further comprise a transmitting module 304 used to transmit information. In one embodiment, the transmitting module 304 is configured to wirelessly transmit a request for permission to send data stored in the storing module 302, which request for permission was discussed above. The transmitting module 304 may be configured to transmit the request to the node 104a, for example. The transmitting module 304 may further be configured to transmit data stored in the storing module 302, either directly from the storing module 302 or after the data stored in the storing module 302 has passed through or been processed by other modules or elements. Thus, the transmitting module 304 may be coupled to the storing module 302, for example as illustrated in FIG. 3. In some embodiments, the data is transmitted by the transmitting module 304 over a plurality or carriers. The data may be transmitted over one or more channels on each of the carriers, as discussed above.

The transmitting module 304 may be implemented using one of or a combination of the transmitter portion of one or more of the transceivers 254a-254r, the modulator 280, the TX data processor 238, and the processor 270. In some embodiments, the transmitting module 304 comprises an antenna and a transceiver. The transceiver may be configured to modulate outbound wireless messages going to the node 104a. The messages may be transmitted via the antenna. The antenna may be configured to communicate with the node 104a over one or more carriers and one or more channels. The wireless message may comprise voice and/or data-only information.

The AT 106a may further comprise a receiving module 306 used to receive information. In one embodiment, the receiving module 306 is configured to wirelessly receive a grant of permission or other such communication indicating that permission has been granted, which may signify that data stored in the storing module 302 may be transmitted, for example using the transmitting module 304. The grant may be generated, for example by the node 104a, in response to a request transmitted by the transmitting module 304, or may be generated in response to other information. Grants of permission were discussed above.

The receiving module 306 may be implemented using one of or a combination of the receiver portion of one or more of the transceivers 254a-254r, the RX data processor 260, and the processor 270. In some embodiments, the receiving module 306 comprises an antenna and a transceiver. The transceiver may be configured to demodulate inbound wireless messages coming from the node 104a. The messages may be received via the antenna. The antenna may be configured to communicate with the node 104a over one or more carriers and one or more channels. The wireless message may comprise voice and/or data-only information. The receiving module 306 may demodulate the data received.

The AT 106a may further comprise a scheduling information module 308 used to generate scheduling information. The scheduling information module 308 is configured to generate scheduling information for a plurality of carriers. In one embodiment, generation of the scheduling information for two or more carriers by the scheduling information module 308 is triggered by a predetermined event. Thus, the scheduling information module 308 may generate scheduling information for several carriers in response to a single event or occurrence.

Scheduling information may be generated by the scheduling information module 308 periodically. The periodicity may be regular, for example according to a determined or established schedule, or the periodicity may be intermittent, for example only when the predetermined event occurs. In some embodiments, the predetermined event is selected so as to occur at regular intervals, for example according to a recurring timer. In some embodiments, even if the periodicity is regular, a predetermined event occurring between the regular periods may trigger the generation of scheduling information at an intermittent time.

In the embodiment illustrated in FIG. 3, the scheduling information module 308 is coupled to the transmitting module 304. The transmitting module 304 may transmit the scheduling information generated by the scheduling information module 308, or the transmitting module 304 may transmit a portion of the generated scheduling information or information or data derived from the generated scheduling information. The scheduling information module 308 may additionally be coupled to the storing module 302 and/or the receiving module 306, for example as illustrated in FIG. 3.

Scheduling information may be transmitted over one or a plurality of carriers, for example by the transmitting module 304. In one embodiment, scheduling information is generated for a plurality of carriers based on information regarding those carriers or based on a state or detected property of those carriers. The scheduling information generated for this plurality of carriers may be transmitted over a single carrier, for example a carrier allocated for the transmission of control information, or the scheduling information for each of the carriers may be transmitted over the respective carrier. In one embodiment, the scheduling information for each carrier is transmitted over a particular channel of that carrier, for example an enhanced dedicated channel (E-DCH). Those of skill in the art will appreciate that scheduling information may also be transmitted over another channel or plurality of channels. In some embodiments, the same or similar scheduling information is generated for transmission over a plurality of carriers. In some embodiments, the scheduling information is always sent over an anchor carrier, and optionally is additionally sent over other carriers. In these embodiments, the scheduling information sent over the other carriers may comprise only a portion of the scheduling information sent over the anchor carrier.

In some embodiments, the scheduling information is sent as a request for permission to send data, which request for permission was discussed above. In other embodiments, a portion of the scheduling information is transmitted as part of the request. In some embodiments, the scheduling information is transmitted separate from the request. For example, a request may be transmitted initially, and then scheduling information transmitted periodically afterwards.

The scheduling information may be used, for example by the node 104a, to assign a time for transmission of data to the AT 106a, for example, or to indicate that the AT 106a has been granted permission to send data stored at the AT 106a, for example in the storing module 302. If the AT 106a has already received a serving grant, for example using the receiving module 306, the scheduling information may be used to update the node 104a regarding a transmission. For example, the scheduling information may alert the node 104a about new information that has been stored, or the scheduling information may include information regarding a changed carrier condition. The scheduling information may provide an indication of the amount of system resources required or requested by the AT 106a and/or the amount of system resources that the AT 106a can use at a given time. Embodiments of scheduling information will be described in additional detail below with respect to FIGS. 4 and 5.

The scheduling information module 308 may be implemented using the processor 270, for example. In some embodiments, the scheduling information module is implemented using a processing system that comprises a plurality of processors. In other embodiments, the processing system comprises or is implemented as a portion of a single processor. Those of skill in the art will appreciate various circuits, chips, modules, and/or components that may be used to implement the scheduling information module 308.

The scheduling information module 308 may additionally be coupled to a power determination module 310. The power determination module 310 is configured to determine power information with respect to a carrier and/or a channel, for example for inclusion in a power headroom, as discussed in additional detail below. The power determination module 310 may also be coupled to the receiving module 306, for example as illustrated in FIG. 3.

The power determination module 310 may be implemented as a portion of the scheduling information module 308 and/or as a portion of the processor 270. In the alternative, the power determination module 310 may be implemented separate from either or both of the scheduling information module 308 and the processor 270. Those of skill in the art will appreciate various circuits, chips, modules, and/or components that may be used to implement the power determination module 310. In addition, those skilled in the art will appreciate methods and processes for use in implementing the functionality of the power determine module 310, for example methods to calculate a $P_{DPCCH}$, described below. Additional functionality of the power determination module 310 will be described below.

The AT 106a may further comprise a timer module 312 used to determine when a select amount of time has elapsed and/or to count processor cycles or the passage of portions of time. The timer module 312 may be coupled to the storing module 302, the receiving module 308m, and/or the scheduling information module 308, for example as illustrated in FIG. 3. The timer module 312 may be implemented using the processor 270, or another processing device or system, for example. Those of skill in the art will appreciate various clocks, signal generators, circuits, chips, modules, and/or components that may be used to implement the timer module 312. Additional functionality of the time module 312 will be described below Although described separately, it is to be appreciated that functional blocks described with respect to the AT 106a need not be separate structural elements. For example, the scheduling information module 308 and the storing module 302 may be embodied in a single chip. The scheduling information module 305 may additionally, or in the alternative, contain memory, such as registers. Similarly, one or more of the functional blocks or portions of the functionality of various blocks may be embodied in a single chip. Alternatively, the functionality of a particular block may be implemented on two or more chips. In addition, additional modules or functionality may be implemented in the AT 106a. For example, the AT 106a may comprise a module for identifying one or more carriers available for use by the AT 106a Similarly, fewer modules or functionalities may be implemented in the AT 106a, and the components of the AT 106a may be arranged in any of a plurality of configurations. Additional or fewer couplings between the various modules illustrated in FIG. 3 or between additional modules may be implemented.

One or more of the functional blocks and/or one or more combinations of the functional blocks described with respect to the AT 106a, such as the scheduling information module 308, the power determination module 310, and/or the timer module 312 may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the AT 106a may also be implemented as a combination of computing devices, e.g., a combination of a DSP and a microprocessor, a plurality of microprocessors, one or more microprocessors in conjunction with a DSP communication, or as any other such configuration or processing system.

Figure 4:
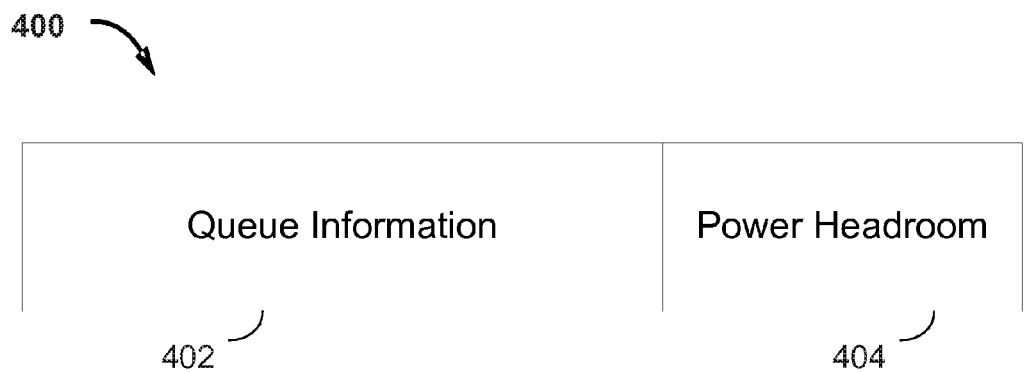
FIG. 4 is an illustration of exemplary scheduling information.

FIG. 4 illustrates an embodiment of scheduling information 400 generated by the scheduling information module 308. The scheduling information is shown as including queue information 402 and power headroom 404. In one embodiment, the scheduling information comprises eighteen bits, with the queue information 402 being represented by 13 of those bits, and the power headroom 404 being represented by 5 of those bits. In other embodiments, the length or size the scheduling information 400 may vary according to its generation, or may vary among different devices or carriers. In some embodiments the scheduling information 400 comprises less than eighteen bits, and in some embodiments the scheduling information 400 comprises greater than eighteen bits. Those of skill in the art will appreciate that generated scheduling information may comprise additional information or omit information described herein in relation to the scheduling information 400. The scheduling information may be formatted as a packet configured for wireless transmission by the transmitting module 304, or may be represented in any other way when generated by the scheduling information unit 308, for example as an array of data stored in a buffer or register of the scheduling information unit 308.

The queue information 402 includes information regarding data stored at the AT 106a, for example data stored in the storing module 302. This information may include, for example, an amount of data stored in the storing module 302 for transmission to the node 104a. As described above, the scheduling information module 308 may be coupled to the storing module 302. In some embodiments, the queue information 402 may be divided into multiple fields, as will be discussed in additional detail below.

The power headroom 404 may include information regarding a power of a signal or a power of transmission, and/or regarding one or more carriers or channels. In some embodiments, information included in the power headroom 404 may represent a carrier condition which can be compared to information in another power headroom representing a carrier condition for that other channel, for example to increase or maximize throughput of transmitted data based upon a maximum transmit power. For example, the node 104a may compare the power headroom for two different carriers in order to determine appropriate transmit powers for each carrier. In some embodiments, a CQI is included in the scheduling information 400, for example in the power headroom 404.

In one embodiment, the power headroom 404 comprises information representing a ratio of a maximum transmission power of the AT 106a and a code power of a dedicated physical control channel (DPCCH). For example, the power headroom 404 may be represented by a user equipment (UE) power headroom (UPH) for the AT 106a, according to the following equation.

$$UPH = P_{max,tx} / P_{DPCCH} \quad (1)$$

In equation 1, $P_{max,tx}$ is the maximum transmission power of the AT 106a, and is determined as the minimum of an allowed uplink transmission power and a nominal maximum output power according to a power class of the AT 106a. $P_{DPCCH}$ is a transmitted code power on the DPCCH for a given carrier as received at the AT 106a, for example as received by the receiving module 306. As described above, the scheduling information module 308 may be coupled to the receiving module 306 and/or the power determination module 310. The power determination module 310 may be configured to calculate the $P_{DPCCH}$ and/or the UPH, or other information in the power headroom 404. As described above, the power determination module 310 may be coupled to the receiving module 306. Information for inclusion in the power headroom 404 may in addition or in the alternative be calculated based on a power of the E-DCH and/or HS-DPCCH, for example.

The UPH and the information in the power headroom 404 may vary according to the channel and/or carrier for which it is determined. For example, communications received over a DPCCH of each of a plurality of carriers will vary based on conditions of each of the carriers. These varying conditions may be reflected in the $P_{DPCCH}$ calculated for each of those carriers, and thus reflected in the UPH and the power headroom 404 of each of those carriers. Thus, the power headroom and the scheduling information determined for each of a plurality of carriers may be unique for each of those carriers. By way of example, the received code power for a carrier may be affected by fading of a signal transmitted over that carrier due to a channel frequency response for that carrier, or may be affected by attenuation of a signal transmitted over that carrier due to interference on that carrier. Those of skill in the art will recognize that there may be embodiments in which the power headroom and/or the scheduling information generated for a plurality of carriers is not unique.

Figure 5:
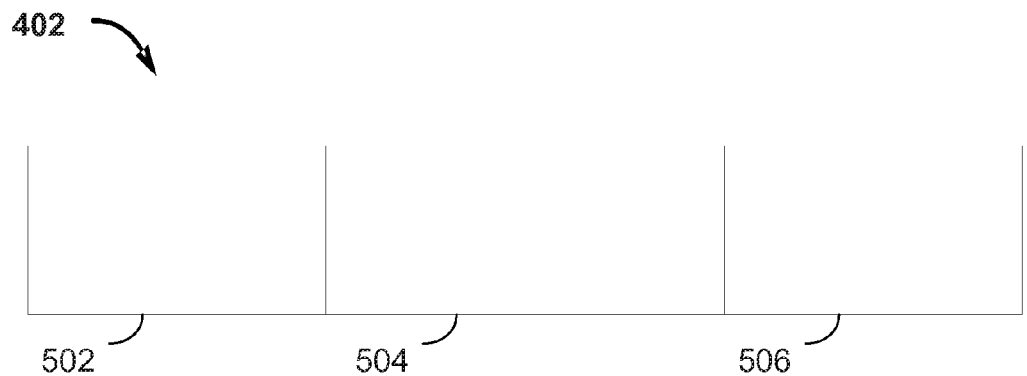
FIG. 5 is an illustration of exemplary queue information shown in FIG. 4.

FIG. 5 illustrates an embodiment of the queue information 402 divided into multiple fields. The fields may be predetermined, or may vary among scheduling information generated at different times. Those of skill in the art will recognize that any number of fields may be utilized. For example, a field of the queue information 402 could be dedicated to information regarding an amount of data stored in the storing module 302, while another field of the queue information 402 could be dedicated to information regarding a priority or quality of service of the data. Another optional field could be used for information regarding an amount of time that the data has been stored if the data has been stored for a time greater than a selected threshold.

The queue information 402 illustrated in FIG. 5 is shown as having three fields 502, 504, and 506. In one embodiment, the field 502 comprises information indicating a channel for transmission of data, which channel has the highest priority of all channels that the AT 106a uses, is using, or is requesting to use to transmit data. For example, the field 502 comprises a highest priority logical channel ID (HLID) represented by four bits. In one embodiment, the field 504 comprises information indicating an amount of data stored in a buffer of the AT 106a, for example as stored in the storing module 302. For example, the field 504 may comprise a total E-DCH buffer status (TEBS) represented by five bits. In one embodiment, the field 506 comprises information indication an amount of data that is stored for transmission over the highest priority channel. For example, the field 506 may comprise a highest priority logical channel buffer status (HLBS) represented by four bits. Those of skill in the art will recognize that the length or size of each of the fields 502, 504, and 506 may vary, and that the fields 502, 504, and 506 may be arranged in any order.

Figure 6:
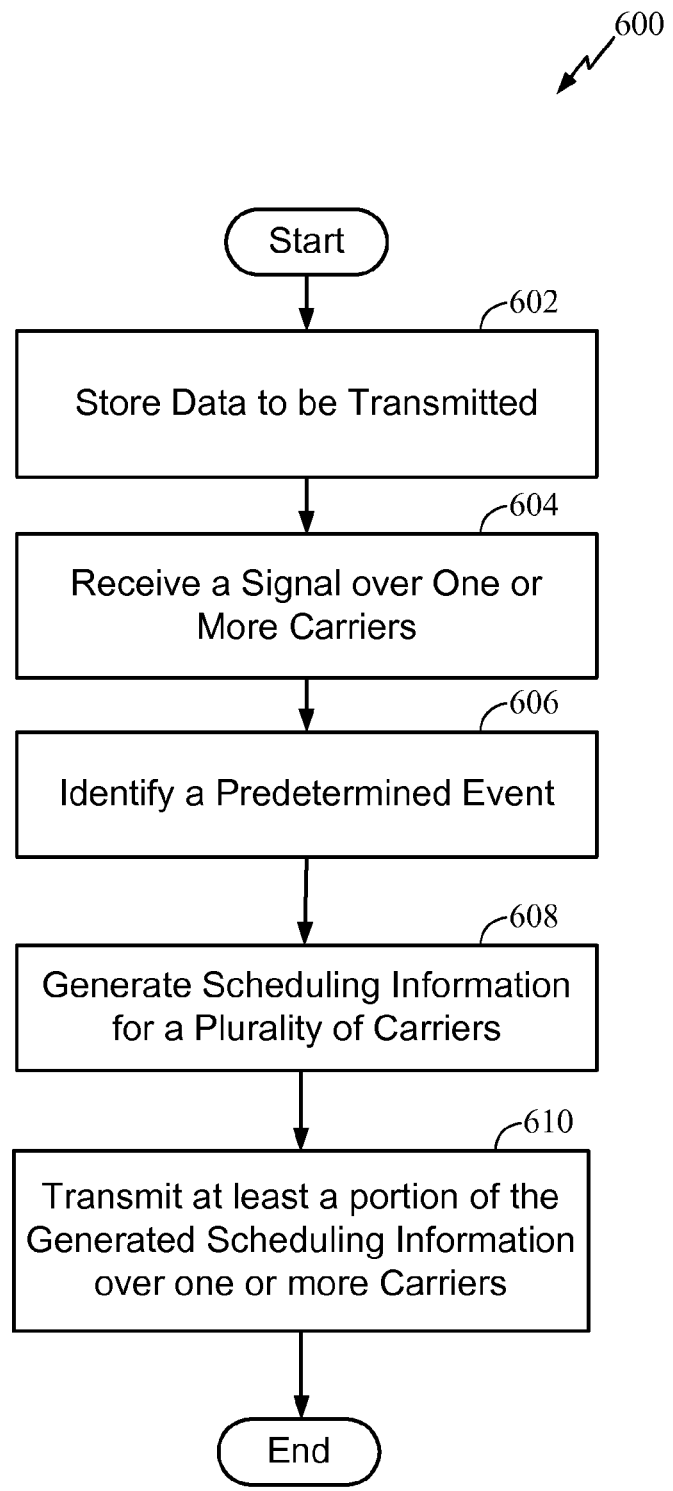
FIG. 6 is a flowchart of an exemplary process of wireless communication for an access terminal.

FIG. 6 illustrates a flow chart showing an embodiment of a method 600 of wireless communication for the AT 106a. At step 602, the data to be transmitted is stored, for example in the storing module 302. At step 604, a signal is received over one or more carriers, for example using the receiving module 306. The signal may comprise any of a number of communications transmitted to the AT 106a. For example, the signal may encode a control communication, a pilot, a beacon, or a serving grant, among other things. At step 606, a predetermined event is identified.

The predetermined event may be identified by the scheduling information module 308, or by any other module of the AT 106a. For example, the timer module 312 may communicate to the scheduling information module 308 that the predetermined event has been identified. As another example, the scheduling information module 308 may be configured to identify the activation or deactivation of one or more processes as being the predetermined event when certain conditions of the storing module 302 are present or satisfied. In some embodiments, the AT 106a illustrated in FIG. 3 comprises an event identifier module (not shown) used to identify one or more predetermined events. The event identifier module may be implemented using the processor 270, or another processing device or system, for example. Those of skill in the art will appreciate various circuits, chips, modules, and/or components that may be used to implement such event identifier module.

The predetermined event may comprise any number of selected events. In some embodiments, the predetermined event comprises expiration of a timer. In one embodiment, the timer module 312 is configured to activate or initiate a timer when data to be transmitted, for example using the transmitting module 304, is stored in the storing module 302 if the AT 106a does not have a current serving grant or other grant of permission. Therefore, the timer may be started when data to be transmitted is stored, which may be indicated by the TEBS being greater than zero, and the AT 106a does not have permission to transmit data, for example to the node 104a. As described above, the timer module 312 may be coupled to the storing module 302. The timer may be used by the timer module 312 and/or the scheduling information module 308 to determine when a select amount of time has elapsed. The predetermined event may comprise the elapsing of the select amount of time, which may be referred to as expiration of the timer, or may comprise the timer module 312 and/or the scheduling information module 308 determining that the select amount of time has elapsed. In some embodiments, a timer as described herein comprises a T_SING (Timer Scheduling Information—"Zero Grant") timer implemented according to an HSUPA or an EUL protocol. In some embodiments, the predetermined event comprises the expiration of the timer only if the TEBS is still greater than zero when the timer expires. Data stored in the buffer may have decreased for any number of reasons. For example, the AT 106a may have received a serving grant and transmitted the data prior to expiration of the timer.

In some embodiments, a timer is maintained for each carrier over which the AT 106a may transmit data. In these embodiments, the timer module 312 may be configured to start a timer for a carrier when all processes for that carrier are or become deactivated if data to be transmitted is stored in the storing module 302. The processes may comprise any number of different types of processes, for example an automatic repeat request delivery process. In addition, the timer module 312 may be configured to start a timer for a carrier when all of a certain type of processes for that carrier are or become deactivated if data to be transmitted is stored in the storing module 302. As described above, the predetermined event may comprise expiration of the timer, and in some embodiments may comprise expiration of the timer only if the TEBS is greater than zero when the timer expires. In some embodiments, the timer module 312 is configured to stop any or all of the timers described above when a service grant is received, for example at the receiving module 306, and/or when a process for the respective carrier is activated. As described above, the timer module 312 may be coupled to the receiving module 306.

Those of skill in the art will appreciate that a single timer may be used for a plurality of carriers. Those of skill in the art will also appreciate that even if separate timers are maintained for each of the carriers over which the AT 106a may transmit data, two or more of the timers may be substantially synchronized. For example, the timer module 312 may be configured to reset one or more existing timers when a new timer is initiated or when another one of the timers is reset. The timers that are reset may be configured to expire at substantially the same time.

In one embodiment, the timer module 312 is configured to start a timer when a serving grant for the AT 106a becomes current and at least one process or one of a certain type of process of the AT 106a is active. A serving grant may become current, for example, when received by the AT 106a, or a previously received serving grant may become current, for example, when a time for transmission indicated in the serving grant arrives. Those of skill in the art will appreciate other embodiments that comprise a current serving grant. As described above, the process may comprise any one of a number of processes, for example an automatic repeat request delivery process. Also as described above, the predetermined event may comprise expiration of the timer. In some embodiments, a timer as described herein comprises a T_SIG (Timer Scheduling Information—not "Zero Grant") timer implemented according to an HSUPA or an EUL protocol. In some embodiments, the timer module 312 is configured to stop any or all of the timers described immediately above when a service grant expires or is otherwise is no longer current, or when all processes are deactivated for the AT 106a. For example, the receiving module 306 may receive a communication, for example from the node 104a, revoking the serving grant. In some embodiments, a timer is maintained for each carrier over which the AT 106a may transmit data. In these embodiments, the timer module 312 may be configured to start a timer when a serving grant for that carrier becomes current and at least one process of the carrier is active. The timer module 312 may be further configured to stop the timer when the service grant for that carrier expires is otherwise is no longer current, or when all processes are deactivated for that carrier.

In some embodiments, the timer module 312 is configured to reset, or restart, any or all of the timers described above when scheduling information is generated by the scheduling information module 308, for example as described below with respect to step 608 in FIG. 6. In some embodiments, a timer for a certain carrier is restarted only if scheduling information is generated by the scheduling information module 308 for that certain carrier.

In some embodiments the predetermined event comprises storing data into the storing module 312 when either the AT 106a or a carrier thereof does not have a current serving grant or other grant of permission, or all processes of the AT 106a or a carrier thereof are deactivated. In some embodiments, a predetermined event is identified only if no other data to be transmitted was being held in the storing module 302 at the time of storing the data into the storing module 312. Thus, for example, the predetermined event in these embodiments may comprise the TEBS becoming more than zero when either the AT 106a or a carrier thereof does not have a current serving grant or other grant of permission, or all processes of the AT 106a or a carrier thereof are deactivated. The processes may comprise any one of the processes described above. In some embodiments, the predetermined event comprises storing data into the storing module 312 when all of a certain type of processes of the AT 106a or a carrier thereof are deactivated. For example, the predetermined event may comprise storing data into the storing module 312 when all hybrid automatic repeat requests (HARD) for a given carrier are deactivated.

In some embodiments, a predetermined event is identified when data is stored in the storing module 312, for example when the TEBS is greater than zero, and when information from a current serving grant for the AT 106a or a carrier thereof indicates that a transmission allowance for the AT 106a or the carrier is insufficient to transmit a protocol data unit (PDU) from a flow of the AT 106a or the carrier. For example, the AT 106a may receive permission to transmit data being stored in the storing module 312, but the permission may indicate that the AT 106a has been allocated a throughput or a transmission power that is insufficient to transmit a PDU. Identification of the predetermined event may comprise the receipt of this permission or the determination that the throughput or transmission power is insufficient. In some embodiments, the PDU comprises the smallest packet that may be transmitted from the AT 106a to the node 104a in the system 100.

In some embodiments, data to be transmitted by the AT 106a may be associated with a priority for transmission. For example, voice data may be associated with a high priority to prevent a lag in conversation, while data corresponding to an application being downloaded from a vendor may be associated with a lower priority because pieces of the application received at varying times may in some implementations be reassembled irrespective of the time at which each of the pieces are received. In these embodiments, the predetermined event may comprise storing new data into the storing module 302 if data previously stored in the storing module 302 is associated with a priority that is lower than a priority of the new data.

In some embodiments, the predetermined event comprises changing the cell by which one or more carriers of the AT 106a is being served. The serving cell may be changed for any number of reasons, as described above. For example, the cell may be changed during a handoff procedure and/or to increase the SNR of signals being received from a node 104 in the cell. In some embodiments, when one carrier is changed to being served by a different cell, all other carriers of the AT 106a are also changed to being served by that different cell. In one embodiment, the predetermined event comprises changing the cell serving a carrier of the AT 106a to a cell that was not in the RLS, which was described above, of the carrier prior to the change. For example, the predetermined event may comprise changing a serving cell of an E-DCH to a new serving cell which was not part of the previous RLS of the E-DCH.

In some embodiments, identifying the predetermined event comprises identifying that delivery of data has failed while using an automatic repeat request method, for example when delivery of data fails according to a HARQ. For example, the predetermined event may comprise failure to deliver scheduling information if the scheduling information was transmitted together with other data in a PDU for a medium access control (MAC) sublayer, for example a MAC-e or MAC-I sublayer.

In some embodiments, identifying the predetermined event comprises identifying that a transform format combination for transmitting data may be defined so as to allow scheduling information generated by the scheduling information module 308, for example as discussed below, to be concatenated. For example, identifying the predetermined event may comprise selecting an E-DCH transform format combination (E-TFC), where quantization in the selected E-TFC allows scheduling information to be concatenated.

Those of skill in the art will appreciate that the predetermined events described herein may be determined or selected by any number of means. In some embodiments, one or more of the predetermined events are established at the time of manufacturing the AT 106a or a component thereof which identifies predetermined events, for example the scheduling information module 308 or the timer module 312. In some embodiments, the processor 270 and/or other components of the AT 106a may be programmed to identify one or more of the predetermined events after manufacture, for example by a network technician or wireless service provider. In some embodiments, a user of the AT 106a may select which of the predetermined events to identify, for example by navigating a series of menus or other representations on a graphical interface with a user interface device. Those of skill in the art will appreciate other means which may be used to select the predetermined events.

In response to the identification of a predetermined event at step 606, scheduling information for a plurality of carriers is generated at step 608, for example by the scheduling information module 308. Thus, generation of scheduling information for multiple carriers is triggered by a predetermined event, of which several embodiments were described in detail above. The plurality of carriers for which the scheduling information is generated may be selected in any number of ways. The scheduling information may be generated for all carriers over which the AT 106a may transmit data, which carriers may be identified in a communication from the node 104a, for example. In some embodiments, the node 104a may inform the AT 106a of carriers for which the AT 106a should generate scheduling information, for example using a wireless communication received by the receiving module 306. In some embodiments, the AT 106a may identify or request carriers for which it will generate scheduling information and/or to transmit data. For example, the carriers may be identified by in a physical layer of the AT 106a, for example by the processor 270 or other processing device or system. The AT 106a may request to use the identified carriers by communicating with the node 104a. In some embodiments, scheduling information is generated for only a subset of all the carriers over which the AT 106a may transmit data. The subset may be selected, for example, by the scheduling information module 308 based at least in part on how much data is being stored in the storing module. In some embodiments, the scheduling information module 308 generates scheduling information for all carriers for which it received a control communication, pilot, beacon, serving grant, or other communication.

A single or multiple state machines may be implemented in the scheduling information module 308 and/or the other components of the AT 106a for identifying the predetermined event and/or generating the scheduling information, for example at steps 606 and/or at step 608. As an example, a state machine may be maintained for several carriers such that when a predetermined event is identified, the generation of scheduling information for the several carriers is triggered. As another example, each carrier may be associated with at least one state machine unique to that carrier. Generation of scheduling information for multiple carriers could be triggered by one of the state machines alerting other state machines when scheduling information is being generated, or by having state machines poll other state machines to determine if the generation of scheduling information has been triggered. In some embodiments, several state machines operate under similar conditions, and thus are triggered to generate scheduling information by a similar event. For example, as described above, several timers may be set with the same value, and the generation of the scheduling information will be triggered by the expiration of the timers. In some embodiments, a single state machine may be configured to identify a plurality of the predetermined event. In some embodiments, each state machine is configured to identify only one of the predetermined events. The state machines may be implemented in appropriate code, software, wiring, circuitry, hardware, or solid state embodiments, for example in the scheduling information module 308 and/or the processor 270.

Generation of the scheduling information at step 608 may comprise determining a power headroom, as described above. Those of skill in the art will recognize that this power headroom may be unique for each carrier for which the scheduling information is generated. Generation of the scheduling information at step 608 may also comprise determining an amount of data being stored in the storing module 302. Those of skill in the art will recognize that this information may be similar for each carrier for which the scheduling information is generated. Those of skill in the art will also recognize other information that may also or in the alternative be included in the scheduling information generated at step 608. As described above, the scheduling information may be embodied as illustrated with respect to FIG. 4, or may be embodied in other ways not explicitly described or illustrated herein.

Those of skill in the art will appreciate that one or more of the predetermined events discussed above may also trigger the generation of scheduling information for a single carrier. For example, storing data in the storing module 302 in the absence of serving grant for a given carrier, storing data in the storing module 302 when all processes for the carrier are deactivated, and/or storing data in the storing module 302 when the a received serving grant comprises a transmit allowance that is insufficient to transmit a PDU from a flow of the carrier may trigger the generation of scheduling information for that given carrier. As another example, identifying a failure to deliver data over a given carrier when using a HARQ or identifying a transform format combination for a carrier so as to allow concatenation of generated scheduling information may trigger the generation of scheduling information for that given carrier. Those of skill in the art will further appreciate that implementations that trigger the generation of scheduling information for multiple carriers may be combined with implementations that trigger the generation of scheduling information for a single carrier. For example, one or more of the predetermined events discussed above may be selected to trigger the generation of scheduling information for multiple carriers, while other predetermined events discussed above may be selected to trigger the generation of scheduling information for a single carrier.

At step 610, at least a portion of the scheduling information generated at step 608 is transmitted over one or more carriers, for example using the transmitting module 304. As described above, the scheduling information generated for the plurality of carriers may be transmitted over a single carrier, for example a carrier allocated for the transmission of control information, or the scheduling information for each of the carriers may be transmitted over the respective carrier. In one embodiment, the scheduling information for each carrier is transmitted over a particular channel of that carrier, for example the E-DCH, as discussed above. Those of skill in the art will appreciate that scheduling information may also be transmitted over another channel or plurality of channels.

Those of skill in the art will appreciate that the example method 600 described with reference to FIG. 6 can be imple- mented in a number of ways. For example, the method can be implemented using specific hardware in the wireless device 106a, using software to configure the wireless device 106a, or using a combination of these implementations. Depending on the particular implementation chosen, it may be possible to execute the example method without requiring specialized hardware. Although the above description of the method 600 of FIG. 6 refers to operation of the AT 106a, the described example method 600 may be implemented in any number of devices.

In an aspect, scheduling information (SI) in high-speed uplink packet access (HSUPA) has two parts: 5 bits for UE headroom and 13 bits for queue length. The UE headroom is generally different on different carriers and Node B needs to know all of them. Therefore, the UE in conventional systems is generally required to send SI on each carrier. However, the queue length is common for all the carriers, wherein the SI on the anchor carrier already carries this information. This creates redundancy in the SI feedback on the non-anchor carriers.

When communicating SI, it should be appreciated that a few options are available. One simple option is to send the queue length on each carrier. This is typically only necessary if the Node B schedulers on each carrier do not communicate with one another. Another option is to eliminate the queue length field in the SI on the non-anchor carriers. This approach is relatively straightforward when SI is piggybacked with regular data in which case the 13 bits for queue length information can be absorbed by the regular data. However, because an 18-bit payload has already been included in E-TFC table to send the stand-alone SI, it is difficult to eliminate queue length information in the stand-alone SI. Another option is to design a new 18-bit SI containing all the headroom on two carriers and the queue information. Differential encoding of the headroom may be used. Zero SI and the "Happy" bit on the secondary carrier can also be used as a request or implicit decision for releasing the secondary carrier.

Figure 7:
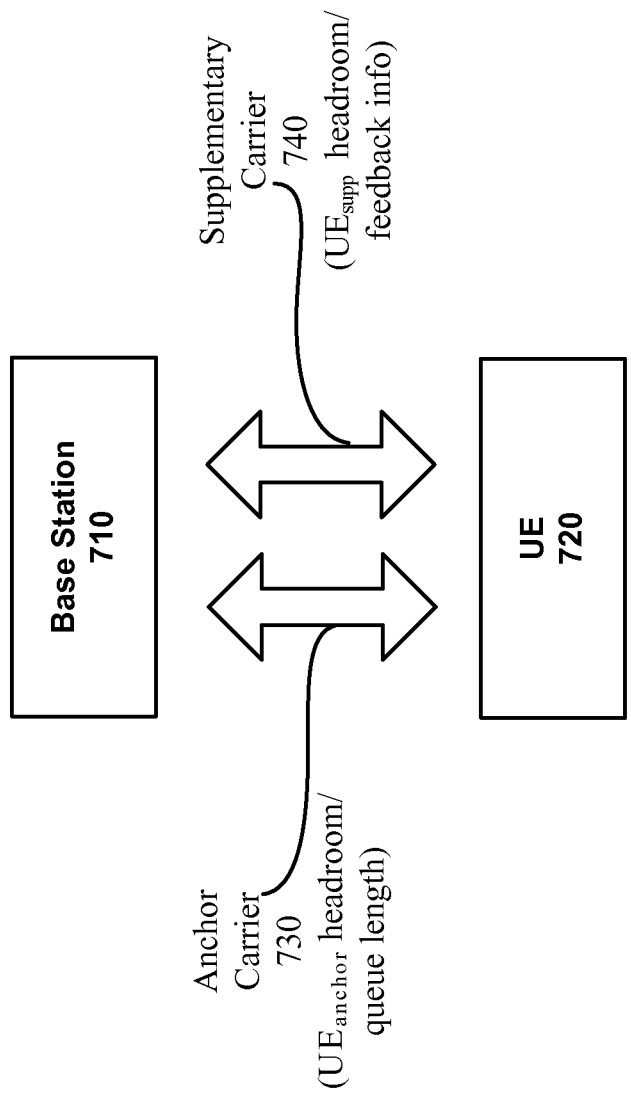
FIG. 7 illustrates a block diagram of an exemplary system that facilitates communicating scheduling information in accordance with an aspect of the subject specification.

Referring next to FIG. 7, an exemplary system that facilitates communicating scheduling information in accordance with an aspect of the subject specification is provided. As illustrated, system 700 includes base station 710 communicating with UE 720 via anchor carrier 730 and supplementary carrier 740. In an aspect, downlink traffic flows from base station 710 to UE 320 and uplink traffic flows from UE 720 to base station 710. Within such embodiment, anchor carrier 730 is utilized to include $UE_{anchor}$ headroom data and queue length data, as shown, whereas supplementary carrier 740 is utilized to include $UE_{supplementary}$ headroom data and new feedback information. In an aspect, the new feedback information is included in the 13 bits of each non-anchor carrier which were previously redundantly allocated for queue length. Feedback information may include downlink path loss differential between the serving cell and a few strong non-serving cells on each carrier; the number or percentage of non-serving RGCH down commands on each carrier, queue information on the second highest priority flow and aggregated power control commands from different cells on each carrier. These new feedbacks enable the Node B to issue high grants without causing severe inter-cell interference. Here, it should be noted that the new feedback may contain information about the anchor carrier although the feedback is sent on the non-anchor carriers.

Those skilled in the art will recognize that steps, methods, algorithms, or aspects described herein may be implemented using a variety of configurations or steps. No single example described above constitutes a limiting configuration or number of steps. Illustrative examples have been described above in general terms of functionality. More or less steps or processes may be implemented, and the order of each of the implemented steps or processes may vary, without deviating from the scope of this disclosure. Those skilled in the art will realize varying ways for implementing the described functionality, but such implementation should not be interpreted as a departure from the scope of this disclosure.

Those of skill in the art will further recognize that the functionality of the modules and/or components of FIGS. 2 and 3 may be implemented in various ways consistent with the teachings herein. In some aspects the functionality of these modules and components may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein.

The functionality described herein (e.g., with regard to one or more of the accompanying figures) may correspond in some aspects to similarly designated "means for" functionality in the appended claims. Referring to FIGS. 2 and 3, the node 104a and the AT 106a are represented as a series of interrelated functional modules.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP communication, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor may read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software, the functions may be stored or transmitted as one or more instructions or code on a computer-readable medium. Computer-readable media includes computer storage media that facilitates transfer of a computer program from one place to another. A storage media may be any available media that can be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Further, if implemented in software, the functions may be transmitted as one or more instructions or code over a transmission medium. A transmission medium may be any available connection for transmitting the one or more instructions or code. For example, if the software is transmitted from a website, server, or other remote source using a coaxial cable, fiber optic cable, twisted pair, digital subscriber line (DSL), then the coaxial cable, fiber optic cable, twisted pair, DSL, are included in the definition of transmission medium.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A method used for communicating scheduling information in a wireless communication system, the method comprising:
generating a first set of scheduling information bits on an anchor uplink carrier, the first set of scheduling information bits identifying an access terminal headroom for the anchor carrier;
generating a second set of scheduling information bits on the anchor uplink carrier, the second set of scheduling information bits identifying a common queue length for each of the anchor carrier and a supplementary carrier;
generating a third set of scheduling information bits on the supplementary uplink carrier, the third set of scheduling information bits identifying an access terminal headroom for the supplementary carrier; and
generating a fourth set of scheduling information bits on the supplementary uplink carrier, the fourth set of scheduling information bits identifying feedback information related to inter-cell interference caused by the access terminal.

2. The method of claim 1, wherein the fourth set of scheduling information bits indicates a number of non-serving enhanced relative grant channel (E-RGCH) down commands received on each of the anchor carrier and the supplementary carrier.

3. The method of claim 1, wherein the fourth set of scheduling information bits indicates a difference in a number of power control up commands received from the serving cell and strong non-serving cells on each carrier.

4. The method of claim 1, wherein the fourth set of scheduling information bits indicates a downlink path loss differential between a serving cell and a strongest non-serving cell on each of the anchor carrier and the supplementary carrier.

5. The method of claim 1, wherein the fourth set of scheduling information bits indicates a buffer status for a second highest priority logical channel.

6. An apparatus for communicating scheduling information in a wireless communication system, the apparatus comprising:
means for generating a first set of scheduling information bits on an anchor uplink carrier, the first set of scheduling information bits identifying an access terminal headroom for the anchor carrier;
means for generating a second set of scheduling information bits on the anchor uplink carrier, the second set of scheduling information bits identifying a common queue length for each of the anchor uplink carrier and a supplementary uplink carrier;
means for generating a third set of scheduling information bits on the supplementary carrier, the third set of scheduling information bits identifying an access terminal headroom for the supplementary uplink carrier; and
means for generating a fourth set of scheduling information bits on the supplementary uplink carrier, the fourth set of scheduling information bits identifying feedback information related to inter-cell interference caused by the access terminal.

7. The apparatus of claim 6, wherein the fourth set of scheduling information bits indicates a number of non-serving enhanced relative grant channel (E-RGCH) down commands received on each of the anchor carrier and the supplementary carrier.

8. The apparatus of claim 6, wherein the fourth set of scheduling information bits indicates a difference in a number of power control up commands received from the serving cell and strong non-serving cells on each carrier.

9. The apparatus of claim 6, wherein the fourth set of scheduling information bits indicates a downlink path loss differential between a serving cell and a strongest non-serving cell on each of the anchor carrier and the supplementary carrier.

10. The apparatus of claim 6, wherein the fourth set of scheduling information bits indicates a buffer status for a second highest priority logical channel.

11. A computer program product for communicating scheduling information in a wireless communication system, comprising:
a non-transitory computer-readable medium comprising code for:
generating a first set of scheduling information bits on an anchor uplink carrier, the first set of anchor carrier bits identifying an access terminal headroom for the anchor uplink carrier;
generating a second set of scheduling information bits on the anchor uplink carrier, the second set of anchor carrier bits identifying a common queue length for each of the anchor uplink carrier and a supplementary uplink carrier;
generating a third set of scheduling information bits on the supplementary uplink carrier, the third set of scheduling information bits identifying an access terminal headroom for the supplementary uplink carrier; and
generating a fourth set of scheduling information bits on the supplementary uplink carrier, the fourth set of scheduling information bits identifying feedback information related to inter-cell interference caused by the access terminal.

12. The computer program product of claim 11, wherein the fourth set of scheduling information bits indicates a number of non-serving enhanced relative grant channel (E-RGCH) down commands received on each of the anchor carrier and the supplementary carrier.

13. The computer program product of claim 11, wherein the fourth set of scheduling information bits indicates a difference in a number of power control up commands received from the serving cell and strong non-serving cells on each carrier.

14. The computer program product of claim 11, wherein the fourth set of scheduling information bits indicates a downlink path loss differential between a serving cell and a strongest non-serving cell on each of the anchor carrier and the supplementary carrier.

15. The computer program product of claim 11, wherein the fourth set of scheduling information bits indicates a buffer status for a second highest priority logical channel.

16. An apparatus for communicating scheduling information in a wireless communication system, the apparatus comprising:
a processor, configured for generating a first set of scheduling information bits on an anchor uplink carrier, the first set of scheduling information bits identifying an access terminal headroom for the anchor uplink carrier, generating a second set of scheduling information bits on the anchor uplink carrier, the second set of scheduling information bits identifying a common queue length for each of the anchor uplink carrier and a supplementary uplink carrier, generating a third set of scheduling information bits on the supplementary uplink carrier, the third set of scheduling information bits identifying an access terminal headroom for the supplementary uplink carrier, and generating a fourth set of scheduling information bits on the supplementary uplink carrier, the fourth set of scheduling information bits identifying feedback information related to inter-cell interference caused by the access terminal; and a memory coupled to the processor for storing data.

17. The apparatus of claim 16, wherein the fourth set of scheduling information bits indicates a number of non-serving enhanced relative grant channel (E-RGCH) down commands received on each of the anchor carrier and the supplementary carrier.

18. The apparatus of claim 16, wherein the fourth set of scheduling information bits indicates a difference in a number of power control up commands received from the serving cell and strong non-serving cells on each carrier.

19. The apparatus of claim 16, wherein the fourth set of scheduling information bits indicates a downlink path loss differential between a serving cell and a strongest non-serving cell on each of the anchor carrier and the supplementary carrier.

20. The apparatus of claim 16, wherein the fourth set of scheduling information bits indicates a buffer status for a second highest priority logical channel.

* * * * *